(12) United States Patent
Quint et al.

(10) Patent No.: US 11,287,402 B2
(45) Date of Patent: Mar. 29, 2022

(54) AUTOMATED METHOD FOR MAINTAINING A CLINICAL DIAGNOSTICS SYSTEM

(71) Applicant: Roche Diagnostics Operations, Inc., Indianapolis, IN (US)

(72) Inventors: Stefan Quint, Munich (DE); Marian Roetzer, Erding (DE); Florian Schweinberger, Munich (DE); Benjamin Tiemann, Munich (DE); Marius Wagner, Munich (DE); Ralf Zimmermann, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 17/113,164

(22) Filed: Dec. 7, 2020

(65) Prior Publication Data

US 2021/0181166 A1     Jun. 17, 2021

(30) Foreign Application Priority Data

Dec. 17, 2019    (EP) .................................... 19217080

(51) Int. Cl.
    *G01N 30/72*            (2006.01)
    *H01J 49/04*            (2006.01)
    *H01J 49/00*            (2006.01)

(52) U.S. Cl.
    CPC ...... *G01N 30/7233* (2013.01); *H01J 49/0431* (2013.01); *H01J 49/004* (2013.01)

(58) Field of Classification Search
    CPC .............. G01N 30/7233; G01N 30/02; G01N 30/8662; G01N 30/8665; H01J 49/0431;

(Continued)

(56) References Cited

U.S. PATENT DOCUMENTS

| 8,173,959 | B1 * | 5/2012 | Boumsellek | .......... | H01J 49/004 |
| | | | | | 250/288 |
| 10,082,517 | B2 * | 9/2018 | Ackermann | ........... | G01N 35/04 |

(Continued)

FOREIGN PATENT DOCUMENTS

| EP | 3425369 A1 | 1/2019 |
| JP | 2004-317461 A | 11/2004 |

(Continued)

OTHER PUBLICATIONS

European Search Report dated May 28, 2020, in Application No. 19217080..1, 2 pp.

*Primary Examiner* — David A Vanore
(74) *Attorney, Agent, or Firm* — Roche Diagnostics Operations, Inc.

(57) ABSTRACT

An analytical system including a mass spectrometer (MS) coupled to liquid chromatography (LC) via an ionization source (IS), and an automated method of maintaining the analytical system in a QC-compliant status are described. The method comprises determining a deviation of the analytical system from a QC-compliant status by determining a deviation of one or more predetermined parameters in an m/z spectrum above one or more predetermined thresholds, triggering an IS and/or MS maintenance procedure upon determining a deviation from the QC-compliant status, determining a return or a failed return to the QC-compliant status during and/or after the IS and/or MS maintenance procedure by determining a return or a failed return respectively of the one or more predetermined parameters in an m/z spectrum below the one or more predetermined thresholds, triggering another IS and/or MS maintenance procedure upon determining a failed return to the QC-compliant status.

14 Claims, 10 Drawing Sheets

(58) Field of Classification Search
CPC .... H01J 49/004; H01J 49/0009; G16H 40/40; B08B 13/00
See application file for complete search history.

(56) References Cited

U.S. PATENT DOCUMENTS

| | | | |
|---|---|---|---|
| 11,125,601 B2* | 9/2021 | Ziegler | G01F 23/245 |
| 11,156,610 B2* | 10/2021 | Upmeier | G01N 33/6854 |
| 2013/0303409 A1* | 11/2013 | Kapps | G01N 30/8658 |
| | | | 506/39 |
| 2020/0124576 A1* | 4/2020 | Kobold | G01N 30/8631 |
| 2021/0233755 A1* | 7/2021 | Wamsley | H01J 49/0009 |

FOREIGN PATENT DOCUMENTS

| | | |
|---|---|---|
| JP | 2007-170985 A | 7/2007 |
| JP | 2013-044638 A | 3/2013 |
| JP | 2013-224870 A | 10/2013 |

* cited by examiner

AUTOMATED METHOD FOR MAINTAINING A CLINICAL DIAGNOSTICS SYSTEM

CROSS-REFERENCE TO RELATED APPLICATIONS

This application claims priority to European Patent Application No. 19217080.1, filed 17 Dec. 2019, the disclosure of which is hereby incorporated by reference in its entirety.

TECHNICAL FIELD

The present disclosure relates to an analytical system and to an automated method of maintaining the analytical system in a QC-compliant status.

BACKGROUND

Automated in-vitro diagnostic analyzers are prevalent in today's laboratory and hospital environments. These devices have become more and more complex due to added functionalities and increased sample throughput. Consequently, errors and malfunctions can occur in a multitude of device components, increasing the potential for decreased productivity of the analyzer and/or less reliable measurement results. In particular, there is a growing interest for the implementation of mass spectrometry and, more specifically, of liquid chromatography coupled to mass spectrometry in the clinical laboratory for in-vitro diagnostics use, which brings an additional level of complexity and technical challenges when it comes to automation.

Spotting and fixing an error or a technical problem can be tedious and cause long downtimes. This often requires the intervention of external service personnel, during which time an analyzer or component thereof might not be available for use, besides generating additional costs.

Moreover, as the complexity of these systems increases, the need for more and more frequent quality control (QC) procedures also typically increases, in order to make sure that the system is maintained in a QC-compliant status. Thus, the effective throughput and usability of such technically complex systems and associated workflows are further reduced because of the time necessary to dedicate to the execution of quality control procedures.

SUMMARY

It is against the above background that the embodiments of the present disclosure provide certain unobvious advantages and advancements over the prior art. In particular, an automated method of maintaining an analytical system including a mass spectrometer (MS) coupled to liquid chromatography (LC) via an ionization source (IS) in a QC-compliant status is herein introduced.

Although the embodiments of the present disclosure are not limited to specific advantages or functionality, it is noted that the present disclosure provides a method that is capable of ensuring analytical performance of the system without unnecessarily compromising sample processing throughput, and that is capable of minimizing system downtime. Another advantage is that the need for manual intervention by an operator and/or by external service personnel in order to maintain the QC-compliant status is reduced to a minimum. Another advantage is that by monitoring of the system automatically and by performing of maintenance procedures only when necessary and to the extent necessary (in contrast to preventive maintenance procedures), the lifetime and use of instrument parts can be extended and downtimes are further minimized.

In accordance with one embodiment of the present disclosure, an automated method of maintaining in a QC-compliant status an analytical system comprising a mass spectrometer (MS) coupled to liquid chromatography (LC) via an ionization source (IS) is provided, the method comprising determining a deviation of the analytical system from a QC-compliant status by determining a deviation of one or more predetermined parameters in an m/z spectrum above one or more predetermined thresholds, triggering an IS and/or MS maintenance procedure upon determining a deviation from the QC-compliant status, determining a return or a failed return to the QC-compliant status during and/or after the IS and/or MS maintenance procedure by determining a return or a failed return respectively of the one or more predetermined parameters in an m/z spectrum below the one or more predetermined thresholds, and triggering another IS and/or MS maintenance procedure upon determining a failed return to the QC-compliant status.

In accordance with another embodiment of the present disclosure, an analytical system is provided comprising a liquid chromatography (LC) module, a mass spectrometer (MS) module coupled to the LC module via an ionization source (IS), and a processor connected to a memory storing instructions that, when executed by the processor, cause the processor to execute any of the automated method steps according to the method disclosed herein.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

An "analytical system" is an automated laboratory apparatus dedicated to the analysis of samples, possibly for in vitro diagnostics. The analytical system may have different configurations according to the need and/or according to the desired laboratory workflow. Additional configurations may be obtained by coupling a plurality of apparatuses and/or modules together. A "module" is a work cell, typically smaller in size than the entire analytical system, which has a dedicated function. This function can be analytical but can also be pre-analytical or post-analytical, or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps. Thus, the analytical system may comprise one analytical apparatus or a combination of any of such analytical apparatuses with respective workflows, where pre-analytical and/or post analytical modules may be coupled to individual analytical apparatuses or be shared by a plurality of analytical apparatuses. Alternatively, pre-analytical and/or post-analytical functions may be performed by units integrated in an analytical apparatus. The analytical system can comprise functional units such as liquid handling units for pipetting and/or pumping and/or mixing of samples and/or reagents and/or system fluids, and also functional units for sorting, storing, transporting, identifying, separating, and detecting analytes in samples. In particular, the analytical system may comprise a liquid chromatography (LC) system or module, a mass spectrometer (MS) system or module, and an ionization source (IS) system or module as an interface between the LC and MS modules, either distinguishable as individual and exchangeable units coupled to each other or at least in part integrated into a common system housing.

"Liquid chromatography or LC" is an analytical process that subjects samples to chromatographic separation through an LC column in order for example to separate analytes of interest from matrix components, e.g., remaining matrix components that after sample preparation may still interfere with a subsequent detection, e.g., a mass spectrometry detection, and/or in order to separate analytes of interest from each other in order to enable their individual detection. "High-performance liquid chromatography" or HPLC, "ultra-high-performance liquid chromatography" or UHPLC, including "micro liquid chromatography" or μLC and "small-bore liquid chromatography" or small-bore LC are forms of liquid chromatography performed under pressure.

A "liquid chromatographic system or LC system" is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and other parts, e.g., for mixing liquids, degassing liquids, tempering liquids, and the like, one or more sensors, such as pressure sensors, temperature sensors and the like, and especially at least one LC pump. The list is not exhaustive. According to an embodiment, the LC system is an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time. The resulting plot looks like an HPLC UV trace with analyte peaks.

An "LC channel" is a fluidic line comprising at least one capillary tubing and/or LC column comprising a stationary phase selected according to the type of sample(s) and analytes and through which a mobile phase is pumped in order to trap and/or separate and elute and/or transfer analytes of interest under selected conditions, e.g., according to their polarity or log P value, size or affinity, as generally known. The at least one LC column in the at least one LC channel may be exchangeable. In particular, the LC system may comprise more LC columns than LC channels, where a plurality of LC columns may be interchangeably coupled to the same LC channel. Capillary tubing may be also used to bypass LC columns.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries which are not packed or loaded with a stationary phase but rely on the surface area of the inner capillary wall to effect separations. The LC column may be exchangeable and/or operate in parallel or in sequence to one or more other LC columns. An LC column may be for example a rapid trap and elute online LC column, a high-performance LC (HPLC) column or an ultra-high-performance LC (UHPLC) column, and may be of any size, including micro-LC columns and small-bore LC columns with an inner diameter of 1 mm or less than 1 mm.

A "mass spectrometer (MS)" is an analytical module comprising a mass analyzer designed to further separate and/or detect analytes based on their mass to charge ratio. According to an embodiment, the mass spectrometer is a fast scanning mass spectrometer. According to an embodiment, the mass spectrometer is a tandem mass spectrometer capable of selecting parent molecular ions, generating fragments by collision-induced fragmentation, and separating the fragments or daughter ions according to their mass to charge (m/z) ratio. According to an embodiment, the mass spectrometer is a triple quadrupole mass spectrometer, as known in the art. Besides quadrupoles, other types of mass analyzers may be used as well, including time of flight, ion trap or combinations thereof.

An "ionization source (IS)" is an interface coupling LC to MS, configured to generate charged analyte molecules (molecular ions) and transferring the charged analyte molecules from a liquid into a gas phase. According to certain embodiments, the ionization source is an electro-spray-ionization (ESI) source, or a heated-electrospray-ionization (HESI) source, or an atmospheric-pressure-chemical-ionization (APCI) source, or an atmospheric-pressure-photo-ionization (APPI) or an atmospheric-pressure-laser-ionization (APLI) source. The LC/MS interface may comprise however a double ionization source, e.g., both an ESI and an APCI source, or a modular exchangeable ionization source.

Typical parts of an ionization source are a nebulizer and a sampling capillary, typically arranged orthogonally or coaxially with respect to each other. An LC eluate exiting an LC channel is guided through a probe including a sprayer needle. In this manner, the LC eluate is nebulized in a volume downstream of the sprayer needle where ionization takes place and the charged analyte molecules thereby obtained are brought into a gaseous phase. A sampling device (e.g., a sampling capillary) is provided to collect the ions in the gaseous phase and guide them into the mass spectrometer.

The ionization source may further include an assembly to provide a curtain gas (e.g., N2) which reduces the entry of background ions (e.g., solvent clusters) into the MS. The assembly can have a curtain plate and an orifice assembly for providing the curtain gas.

In order to optimize ionization conditions, it is also possible to adjust solvent composition by adding a make-up flow directly before the ionization source to adjust pH, salts, buffers or organic content.

Such ionization sources are known in the art and not further elucidated here.

The term "QC-compliant status" refers to the ability of the analytical system to perform according to specification, which is to ensure analytical performance and achieve its intended purpose as specified by the manufacturer. Thus, it refers to the ability to correctly detect and/or measure analytes of interest with specified precision, accuracy and reproducibility.

Determining a "deviation of the analytical system from a QC-compliant status" herein refers to a step of measuring quantifiable and comparable features or characteristics, herein referred to as predetermined parameters, of an m/z spectrum, and determining a deviation of these predetermined parameters from expected values, that is determining a deviation of the measured values from values measured in a QC-compliant status, under the same or similar conditions, above one or more predetermined thresholds.

According to certain embodiments the one or more predetermined parameters are any one or more of shape or area of one or more m/z peaks, signal/noise ratio, m/z peak height, ratio of m/z peak heights, background signal intensity, m/z value of peak maximum, m/z mass position, presence of one or more unexpected m/z peaks, and height of the one or more unexpected m/z peaks.

The m/z spectrum may be one obtained during sample analysis, during a control analysis (using a control sample) or at any time, including without samples flowing through the LC system, e.g., during LC liquid flow or even without liquid flow, by analyzing the background signal. In particular, the m/z spectrum may be a full scan spectrum obtained by scanning across the m/z measurable range of the mass spectrometer or a partial scan spectrum obtained by scanning across a selected m/z range within the m/z measurable range. In particular, multiple full or partial m/z scan data may be repeatedly obtained, at intervals or continuously, in any given time frame, by running an m/z scan after the other.

An "IS and/or MS maintenance procedure" is a procedure intended to resolve a root cause of a technical issue in the ionization source and/or mass spectrometer respectively that is responsible for the deviation from the QC-compliant status. Possible root causes may be clogging or accumulation of contaminants in the ionization source and/or mass spectrometer, such as analytes and matrix components leading to decreased performance of the analytical system.

The term "trigger" or "triggering" is herein used to intend either an automatic procedure that is initiated and executed by the analytical system automatically, or a semiautomatic procedure including at least one automatic step, and also prompting a user to manually intervene.

According to an embodiment, the IS and/or MS maintenance procedure is any one or more of an IS cleaning procedure, an IS and/or MS bake-out procedure, and an intervention procedure.

An "IS cleaning procedure" is an automatically initiated and executed cleaning procedure of the ionization source comprising liquid infusion into the IS. Liquid infusion may comprise purging through the sprayer needle by increasing LC flow or make-up flow, e.g., using LC solvent, e.g., methanol, e.g., up to 1 or even several mL/min. It may optionally further comprise increasing temperature and/or gas pressure and/or changing the applied electric potential.

An "IS and/or MS bake-out procedure" is an automatically initiated and executed procedure comprising increasing the temperature of the IS or IS parts and/or MS parts, particularly metal parts, e.g., up to temperatures of 200° C., in order to accelerate desorption kinetics of eventual adsorbates. Heating may be additionally advantageous for more quickly reestablishing a condition of vacuum, e.g., pressure conditions up to $10^{-10}$ mbar, after venting.

An "intervention procedure" is a semiautomatic procedure comprising manual cleaning and/or repairing and/or replacing of the IS or IS parts and/or of MS parts, and comprising automated reducing of the IS and/or MS temperature before manual intervention, and automated increasing of the IS and/or MS temperature after manual intervention, and/or automated reducing or removing of a vacuum condition in the IS and/or MS before manual intervention and automated reestablishment of the vacuum condition in the IS and/or MS after manual intervention. In this way, manual steps are reduced to a minimum and the process is greatly simplified. In addition, the manual intervention time is reduced to a minimum, since the system is automatically prepared for manual intervention and automatically returns to an operational status after manual intervention.

According to certain embodiments, the IS and/or MS maintenance procedure further comprises any one or more of automated increasing of gas flow, e.g., curtain gas, in order to reduce the IS and/or MS temperature, automated disconnection of the IS and/or MS from power supply, e.g., before manual intervention and eventual automated reconnection after manual intervention, automated enablement/disablement of manual access to the IS and/or MS by automated interlock activation/deactivation, and automated changing of a vacuum condition in the IS and/or mass spectrometer.

In accordance with one embodiment, the method comprises determining a return or a failed return to the QC-compliant status during and/or after the IS and/or MS maintenance procedure by determining a return or a failed return respectively of the one or more predetermined parameters in an m/z spectrum below the one or more predetermined thresholds.

Thus according to an embodiment, the method includes repeated measuring/monitoring of the same predetermined parameters that triggered the IS and/or MS maintenance procedure during the IS and/or MS maintenance itself, that is by obtaining and evaluating an m/z spectrum while the IS and/or MS maintenance is being executed. However, obtaining and evaluating of an m/z spectrum may alternatively occur after completion of the IS and/or MS maintenance procedure, and may include eventually running a control sample.

In particular, according to an embodiment, the method comprises interrupting the IS cleaning procedure or the IS and/or MS bake-out procedure upon determining a return of the one or more predetermined parameters in the m/z spectrum obtained during the IS cleaning procedure or during the IS and/or MS bake-out procedure respectively below the one or more predetermined thresholds. This enables to perform maintenance procedures only to the extent necessary.

According to an embodiment, the method comprises triggering a repeated IS cleaning procedure under the same or different conditions upon determining a failed return to the QC-compliant status during or after the IS cleaning procedure, or triggering a repeated IS and/or MS bake-out procedure under the same or different conditions upon determining a failed return to the QC-compliant status during or after the IS and/or MS bake-out procedure. "Different conditions" may refer for example to a change of one or more parameters like for example a change of liquid and/or gas flow rate, change of liquid/liquid composition, change of temperature, and/or change of pressure/vacuum condition. According to an embodiment, the method comprises triggering the IS and/or MS bake-out procedure after the IS cleaning procedure upon determining a failed return to the QC-compliant status during or after the IS cleaning procedure.

According to an embodiment, the method comprises triggering the intervention procedure after the IS cleaning procedure and/or the IS and/or MS bake-out procedure upon determining a failed return to the QC-compliant status during or after the IS cleaning procedure and/or the IS and/or MS bake-out procedure.

According to an embodiment, the method comprises setting different thresholds with respect to the degree of deviation of the one or more predetermined parameters in order to trigger respective IS and/or MS maintenance procedures. In particular, the different thresholds may reflect a sort of prioritization between different IS and/or MS maintenance procedures, e.g., according to the level of automatization, e.g., from fully automated procedure to semiautomatic procedure, and/or according to the increasing level of complexity and time required for executing the procedure, and/or according to the increasing efficacy of the procedure for returning to a QC-compliant status, with larger degrees of deviations possibly requiring higher efficacy of procedure.

In particular, according to an embodiment, the method comprises setting a first threshold for the deviation of the one or more predetermined parameters in order to trigger the IS cleaning procedure, setting a second threshold for the deviation of the one or more predetermined parameters in order to trigger the IS and/or MS bake-out procedure, and setting a third threshold for the deviation of the one or more predetermined parameters in order to trigger the intervention procedure, where the third threshold is higher than the second threshold and the second threshold is higher than the first threshold.

According to an embodiment, the method comprises triggering the IS and/or MS bake-out procedure upon determining a failed return to the QC-compliant status during or after the IS cleaning procedure, and/or triggering the intervention procedure upon determining a failed return to the QC-compliant status during or after the IS and/or MS bake-out procedure.

According to an embodiment, the predetermined parameters and relative thresholds are the presence of unexpected or unwanted peaks indicating the presence of contaminants and respective peak characteristics indicating the degree of contamination. Determining a return to a QC-compliant status may refer to determining disappearance of such peaks or return of the respective peak characteristics to a level below the predetermined threshold. Determining a failed return to a QC-compliant status may refer to determining the continued appearance of such peaks or a failed return of the respective peak characteristics to a level below the predetermined threshold.

According to an embodiment, determining the deviation of the one or more predetermined parameters above the one or more thresholds comprises normalizing peak intensities to intensities of ubiquitous peaks in the m/z spectrum.

According to an embodiment, determining the deviation of the one or more predetermined parameters above the one or more thresholds comprises weight averaging peak intensities in an m/z region of the m/z spectrum.

The term "ubiquitous peaks in the m/z spectrum" refers to (common) background ions encountered in LC-MS systems, e.g. contamination ions but not only. Examples include but are not limited to polyethylene glycol, polypropylene glycol, or other polymeric substances, phthalates, organic solvent clusters, solvent modifiers, fatty acids, metal ions, detergents like tritons, tweens, and siloxanes. Metal ions, in particular, form adducts with varying numbers of substrates to give characteristic ESI+/ESI− ions. A particular example is given by Cesium Iodine (CsI) that can be used for internal calibration purposes in some embodiments as it can build clusters with various other substances, thereby resulting in characteristic m/z peaks or patterns.

Periodic signals recurring with an m/z period of 8-260 for example may be characteristic either of polymers (which can be recognized by their repeating monomer unit) or, e.g. of clusters, e.g. CsI clusters. High periodicity, e.g. recurring with an m/z period ≥300 might be characteristic of the baseline caused by chemical noise, whereas low periodicity, e.g. recurring with an m/z period of 1-7 might refer to isotopic effects.

An "m/z period" refers to the interval or m/z distance between consecutive m/z peaks of a periodic signal comprising a plurality of recurring m/z peaks equally distant. According to an embodiment, determining the deviation of the one or more predetermined parameters above the one or more thresholds comprises reducing the complexity of m/z scan data by using a mathematical transform function in order to identify periodic signals above a predetermined threshold. The mathematical transform function can be for example a Wavelet transform function. By comparing transformed m/z scan data, out of a multitude of m/z spectra, determining periodic signals as the one or more predetermined parameters deviating above a threshold, can be quick and efficient, as the data have been compressed, hence are much smaller in size versus the original data. Another advantage is that there is no need to identify each particular signal using sophisticated and calculation-intensive peak identification algorithm.

In accordance with another embodiment of the present disclosure, an analyzer is provided comprising a liquid chromatography (LC) module, a mass spectrometer (MS) module coupled to the LC module via an ionization source (IS), and a processor connected to a memory storing instructions that, when executed by the processor, cause the processor to execute any of the automated method steps according to any of the embodiments described herein.

As used herein, the term "processor", also interchangeably referred to as "controller", can mean central processing units, microprocessors, microcontrollers, reduced instruction circuits (RISC), application specific integrated circuits (ASIC), logic circuits, and any other circuit or processor capable of executing the functions/methods described herein. Regardless of the type of processor, it is configured to execute one or more of the methods described herein.

The processor may be integrated into the analytical system or be a separate logic entity in communication with the analytical system via a direct connection, wired or wirelessly, or indirectly over a communications network, wired or wirelessly, such as a wide area network, e.g., the Internet or a Health Care Provider's local area network or intranet, via a network interface device. In some embodiments, the processor might be integral with a data management unit, e.g., implement on a computing device such as a desktop computer, a laptop, a smartphone, a tablet, PDA, etc., may be comprised by a server computer and/or be distributed/shared across/between a plurality of analytical systems. Moreover, the systems can include remote devices, servers and cloud-based elements that communicate via wires or wirelessly (e.g., infrared, cellular, Bluetooth®), or a remote PC/server or a cloud-based system. The processor may be also configurable to control the analytical system in a way that workflow(s) and workflow step(s) are conducted by the analytical system. In particular, the processor may communicate and/or cooperate with a scheduler and/or a data manager in order to take into account incoming test orders and/or received test orders, and a number of scheduled process operations associated with the execution of the test orders in order to plan when and which IS and/or MS maintenance procedures have to be executed and/or triggered. In particular, the processor may be configured to execute any of the method steps according to any of the above described embodiments.

The processor may be further configured to prevent queueing up samples, for which a test order has been received but processing has not yet started, from entering the analytical system and/or from starting a sample test workflow until an IS and/or MS maintenance procedure has been completed.

A "memory" may be a non-transitory computer readable medium or non-transitory computer readable memory and may be configured as a nonvolatile computer readable medium. The memory may comprise RAM, ROM, flash memories, hard drives, or any device capable of storing machine readable instructions such that the machine readable instructions of the program can be accessed and executed by the processor. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory or media. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. Other and further objects, features and advantages will appear from the following description of exemplary embodiments and accompanying drawings, which serve to explain the principles more in detail.

In order that the embodiments of the present disclosure may be more readily understood, reference is made to the following examples, which are intended to illustrate the disclosure but not limit the scope thereof.

Figure 1:
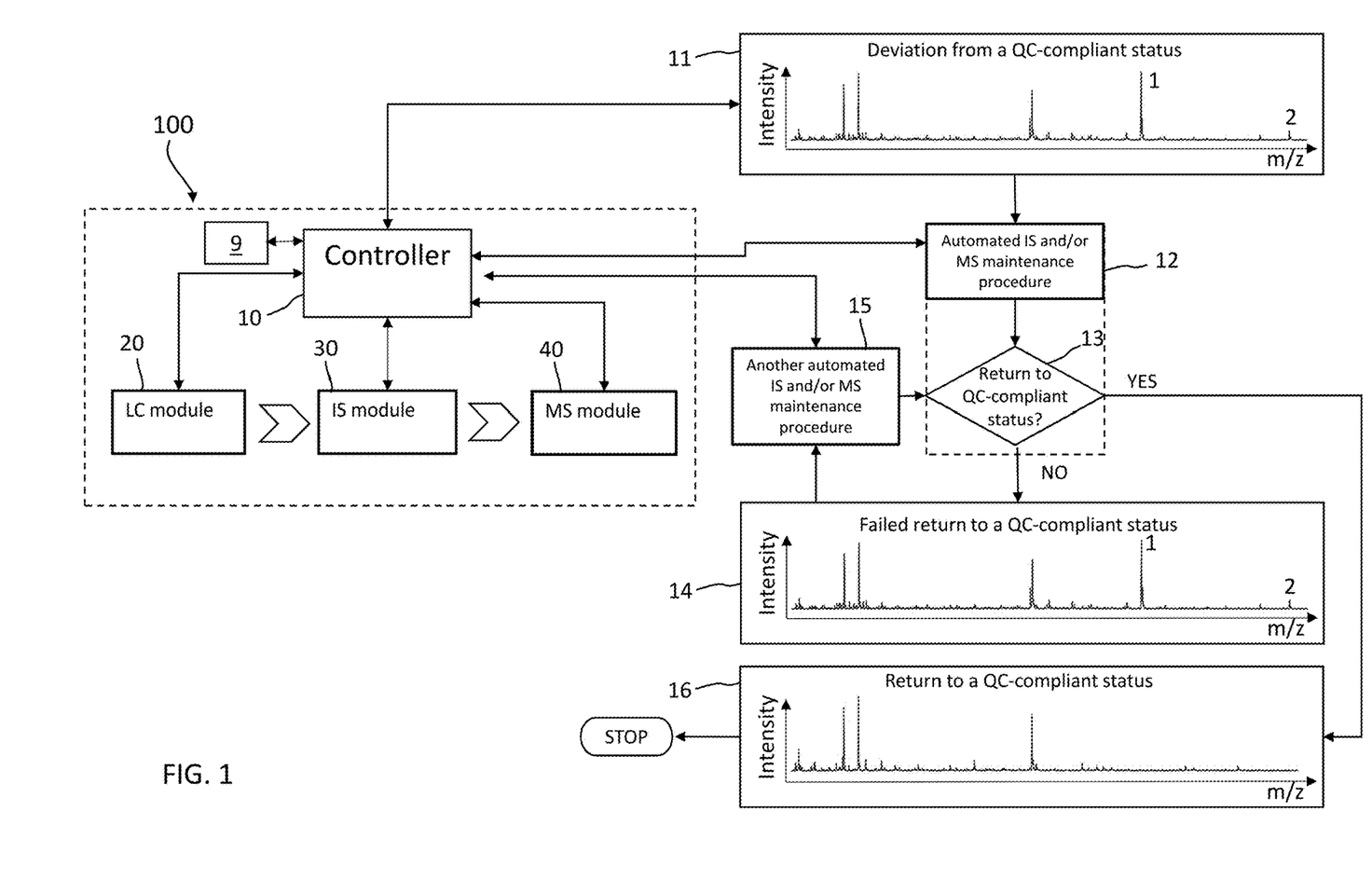
FIG. 1 schematically depicts an analytical system and a method of maintaining the analytical system in a QC-compliant status.

FIG. 1 schematically depicts an analytical system 100 and a method of maintaining the analytical system 100 in a QC-compliant status. The analytical system 100 comprises a liquid chromatography (LC) module 20, a mass spectrometer (MS) module 40 coupled to the LC module 20 via an ionization source (IS) module 30, and a controller 10 connected to a memory 9 storing instructions that, when executed by the controller 10, cause the processor to execute any of the automated method steps. In particular, the method comprises determining a deviation from a QC-compliant status of the analytical system 100 by determining a deviation of one or more predetermined parameters 1, 2 in an m/z spectrum 11 above one or more predetermined thresholds, in this example the presence of one or more unexpected m/z peaks 1, 2 related to contaminants. The method further comprises automatically triggering an IS and/or MS maintenance procedure 12 upon determining a deviation from the QC-compliant status, determining a return or a failed return to the QC-compliant status 13 during and/or after the automated IS and/or MS maintenance procedure 12 by determining a return or a failed return respectively of the one or more predetermined parameters 1, 2 in an m/z spectrum 14, 16 below the one or more predetermined thresholds, in this example the continued appearance or disappearance of the contaminant peaks 1, 2 in m/z spectrum 14, 16, respectively, and triggering another automated IS and/or MS maintenance procedure 15 upon determining a failed return to the QC-compliant status. The method is stopped once a return to a QC compliant status is determined. The spectra 11, 14, 16 and the parameters shown are only exemplary. Parameters may include any one or more of shape or area of one or more m/z peaks, signal/noise ratio, m/z peak height, ratio of m/z peak heights, background signal intensity, m/z value of peak maximum, m/z mass position, presence of one or more unexpected m/z peaks, or height of the one or more unexpected m/z peaks.

Figure 2:
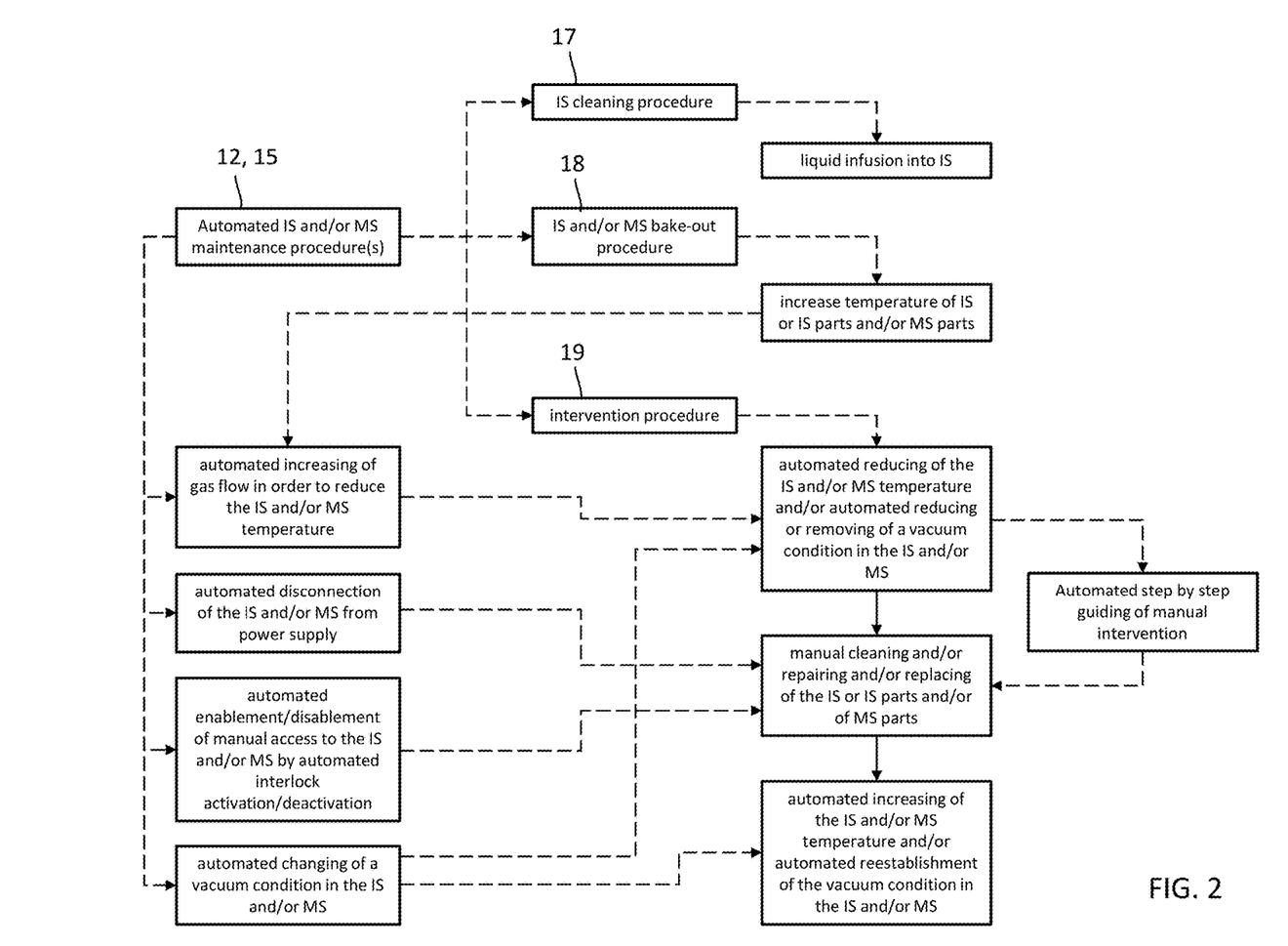
FIG. 2 schematically depicts examples of automated IS and/or MS maintenance procedures according to embodiments of the method of FIG. 1.

FIG. 2 schematically depicts examples of automated IS and/or MS maintenance procedures 12, 15 according to embodiments of the method of FIG. 1. The automated IS and/or MS maintenance procedure(s) 12, 15 can be any one or more of an IS cleaning procedure 17 comprising liquid infusion into the IS; an IS and/or MS bake-out procedure 18 comprising increasing the temperature of the IS or IS parts and/or MS parts; an intervention procedure 19 comprising manual cleaning and/or repairing and/or replacing of the IS or IS parts and/or of MS parts, the intervention procedure 19 further comprising automated reducing of the IS and/or MS temperature before manual intervention and automated increasing of the IS and/or MS temperature after manual intervention and/or automated reducing or removing of a vacuum condition in the IS and/or MS before manual intervention and automated reestablishment of the vacuum condition in the IS and/or MS after manual intervention. The intervention procedure 19 may further comprise an automated step by step guiding of manual intervention, indicating e.g., via a graphical or visual user interface, the steps to be carried out in a correct sequence, and possibly including manual step verification. The automated IS and/or MS maintenance procedure 12, 15 may comprise independently or in connection to any of the IS cleaning procedure 17, IS and/or MS bake-out procedure 18, and intervention procedure 19, any one or more of automated increasing of gas flow in order to reduce the IS and/or MS temperature; automated disconnection of the IS and/or MS from its power supply; automated enablement/disablement of manual access to the IS and/or MS by automated interlock activation/deactivation; or automated changing of a vacuum condition in the IS and/or MS. Also the IS cleaning procedure 17 and the IS and/or MS bake out procedure 18 may be combined and may occur at least in part simultaneously.

Figure 3:
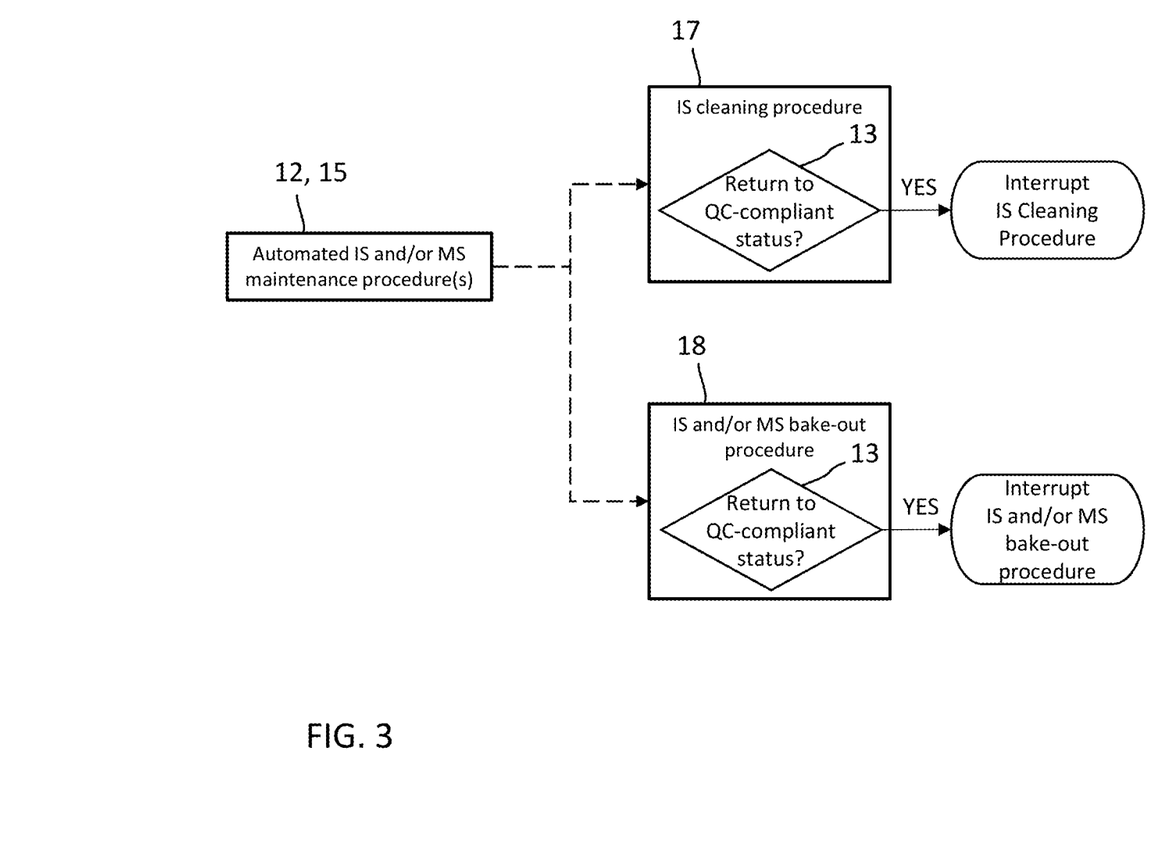
FIG. 3 schematically depicts another embodiment comprising interrupting the IS cleaning procedure or the IS and/or MS bake-out procedure.

FIG. 3 depicts schematically another embodiment according to which the method comprises interrupting the IS cleaning procedure 17 or the IS and/or MS bake-out procedure 18 upon determining a return to a QC compliant status 13, that is a return of the one or more predetermined parameters in an m/z spectrum, during the IS cleaning procedure 17 or during the IS and/or MS bake-out procedure 18, respectively, below the one or more predetermined thresholds.

Figure 4:
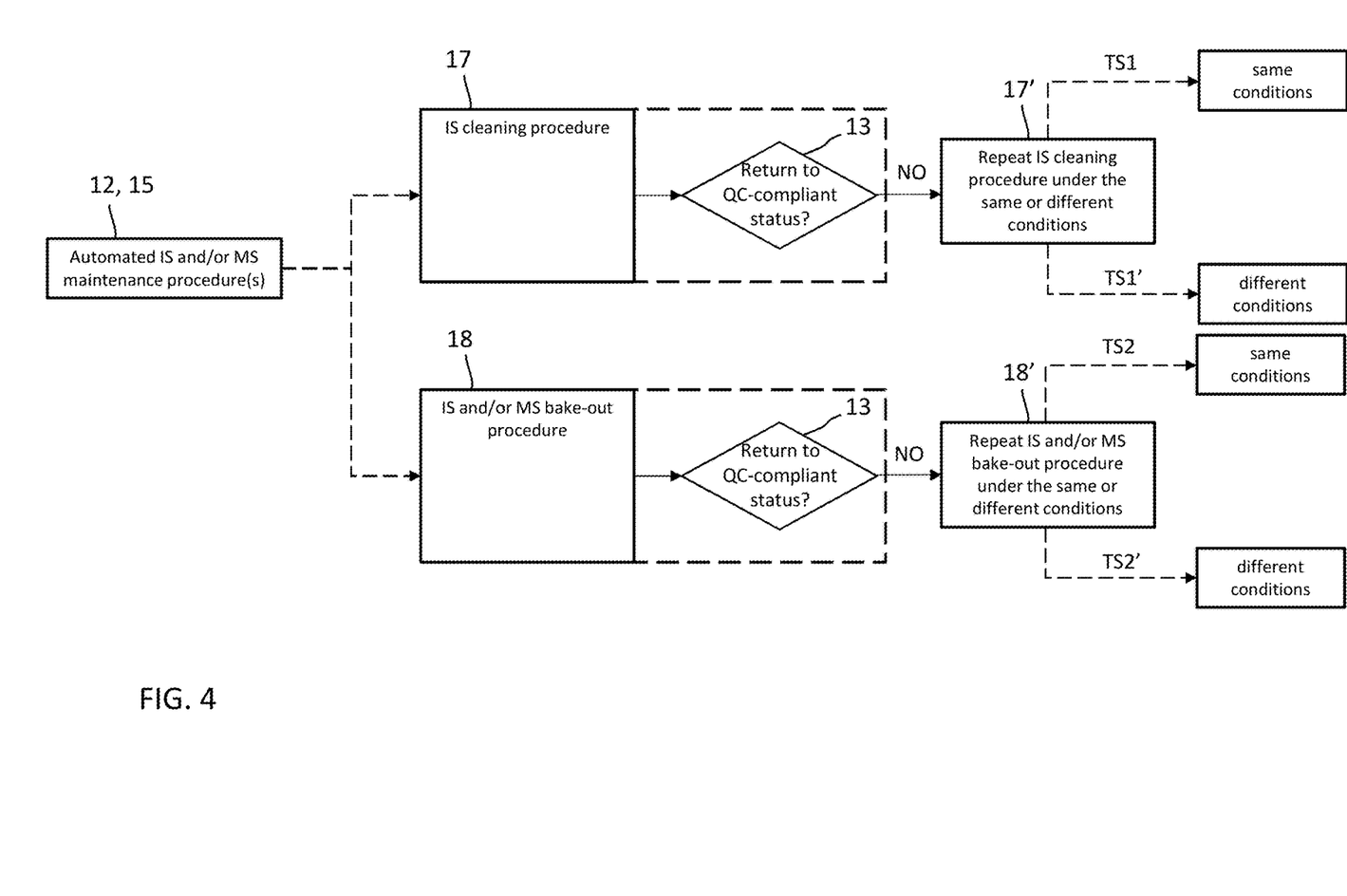
FIG. 4 schematically depicts another embodiment comprising triggering a repeated IS cleaning procedure or a repeated IS and/or MS bake-out procedure.

FIG. 4 depicts schematically another embodiment according to which the method comprises triggering a repeated IS cleaning procedure 17' under the same or different conditions upon determining 13 a failed return to the QC-compliant status during or after the IS cleaning procedure 17, or triggering a repeated IS and/or MS bake-out procedure 18' under the same or different conditions upon determining 13 a failed return to the QC-compliant status during or after the IS and/or MS bake-out procedure 18. The method may comprise setting a first threshold TS1 for the deviation of the one or more predetermined parameters in order to repeat the IS cleaning procedure 17' under the same conditions and a second threshold TS1' for the deviation of the one or more predetermined parameters in order to repeat the IS cleaning procedure 17' under different conditions. Analogously, the method may comprise setting a first threshold TS2 for the deviation of the one or more predetermined parameters in order to repeat the IS and/or MS bake-out procedure 18' under the same conditions and a second threshold TS2' for the deviation of the one or more predetermined parameters in order to repeat the IS and/or MS bake-out procedure 18' under different conditions.

Figure 5:
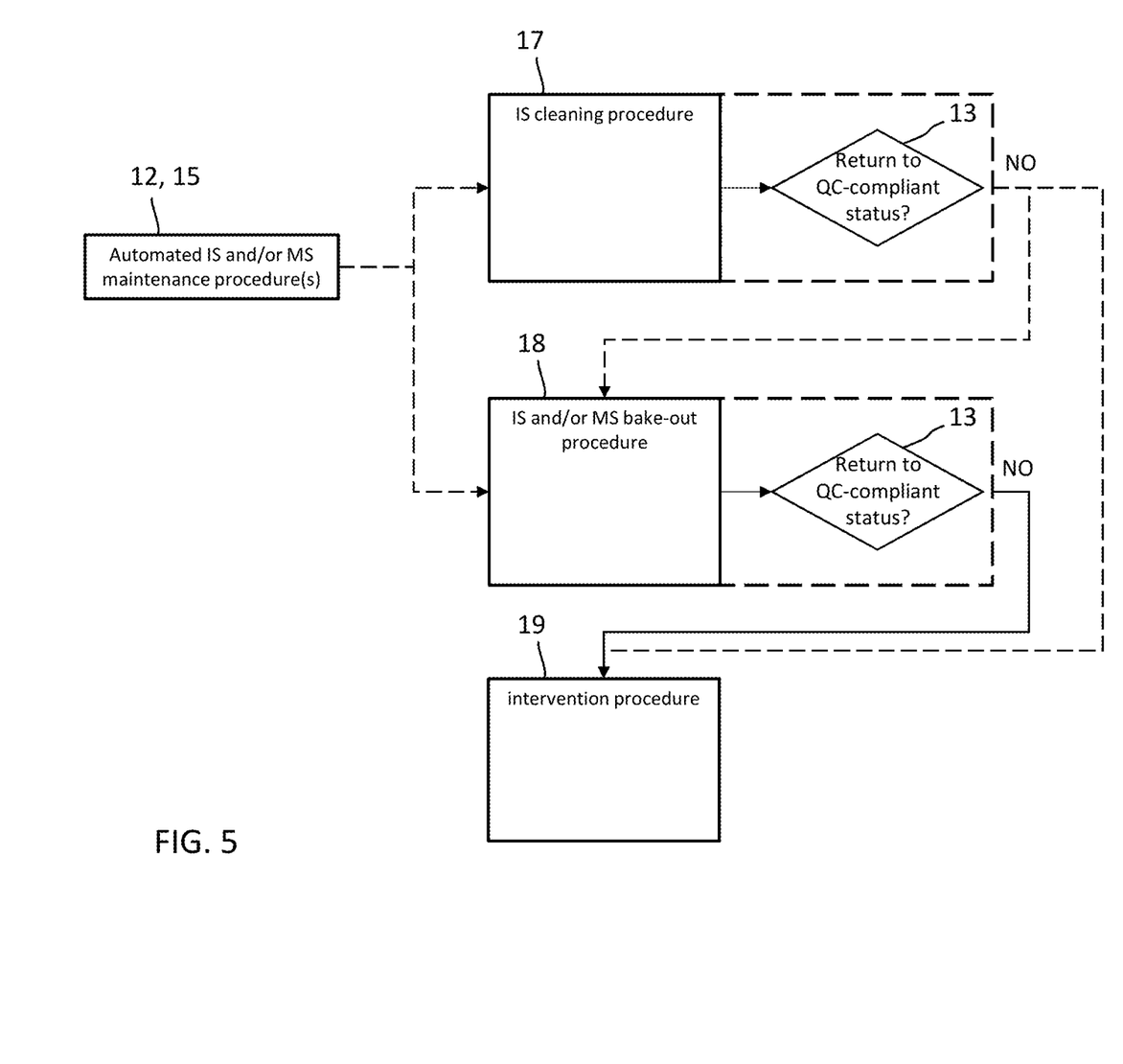
FIG. 5 schematically depicts additional aspects of the method of FIG. 1 comprising sequential triggering of different IS and/or MS bake-out procedures.

FIG. 5 depicts schematically another embodiment according to which the method comprises triggering the IS and/or MS bake-out procedure 18 after the IS cleaning procedure 17 upon determining 13 a failed return to the QC-compliant status during or after the IS cleaning procedure 17. The method may further comprise triggering the intervention procedure 19 after the IS cleaning procedure 17 and/or the IS and/or MS bake-out procedure 18 upon determining 13 a failed return to the QC-compliant status during or after the IS cleaning procedure 17 and/or the IS and/or MS bake-out procedure 18.

Figure 6:
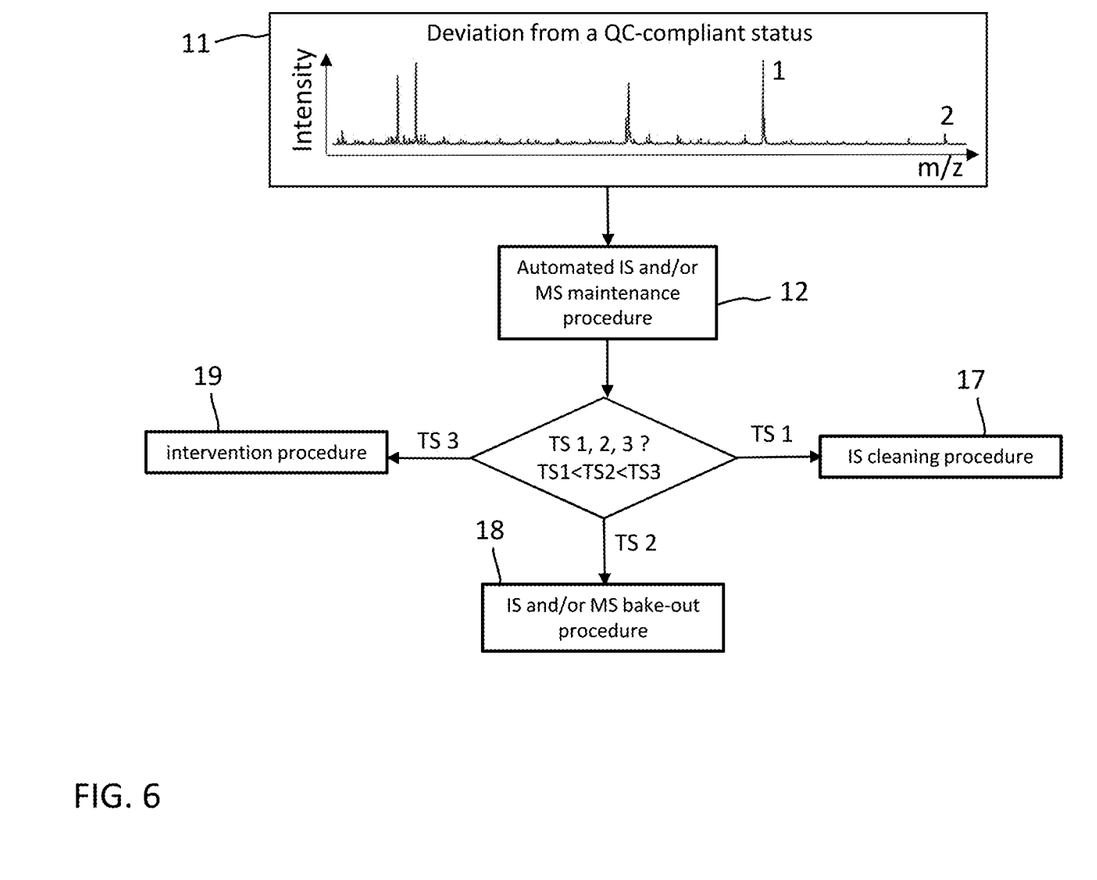
FIG. 6 schematically depicts additional aspects of the method of FIG. 1 comprising triggering of different IS and/or MS bake-out procedures according to respective thresholds.

FIG. 6 depicts schematically another embodiment according to which the method comprises setting a first threshold TS1 for the deviation of the one or more predetermined parameters 1, 2 in an m/z spectrum 11 in order to trigger the IS cleaning procedure 17; setting a second threshold TS2 for the deviation of the one or more predetermined parameters 1, 2 in the m/z spectrum 11 in order to trigger the IS and/or MS bake-out procedure 18; setting a third threshold TS3 for the deviation of the one or more predetermined parameters 1, 2 in the m/z spectrum 11 in order to trigger the intervention procedure 19; where the third threshold TS3 is higher than the second threshold TS2 and the second threshold TS2 is higher than the first threshold TS1.

Figure 7:
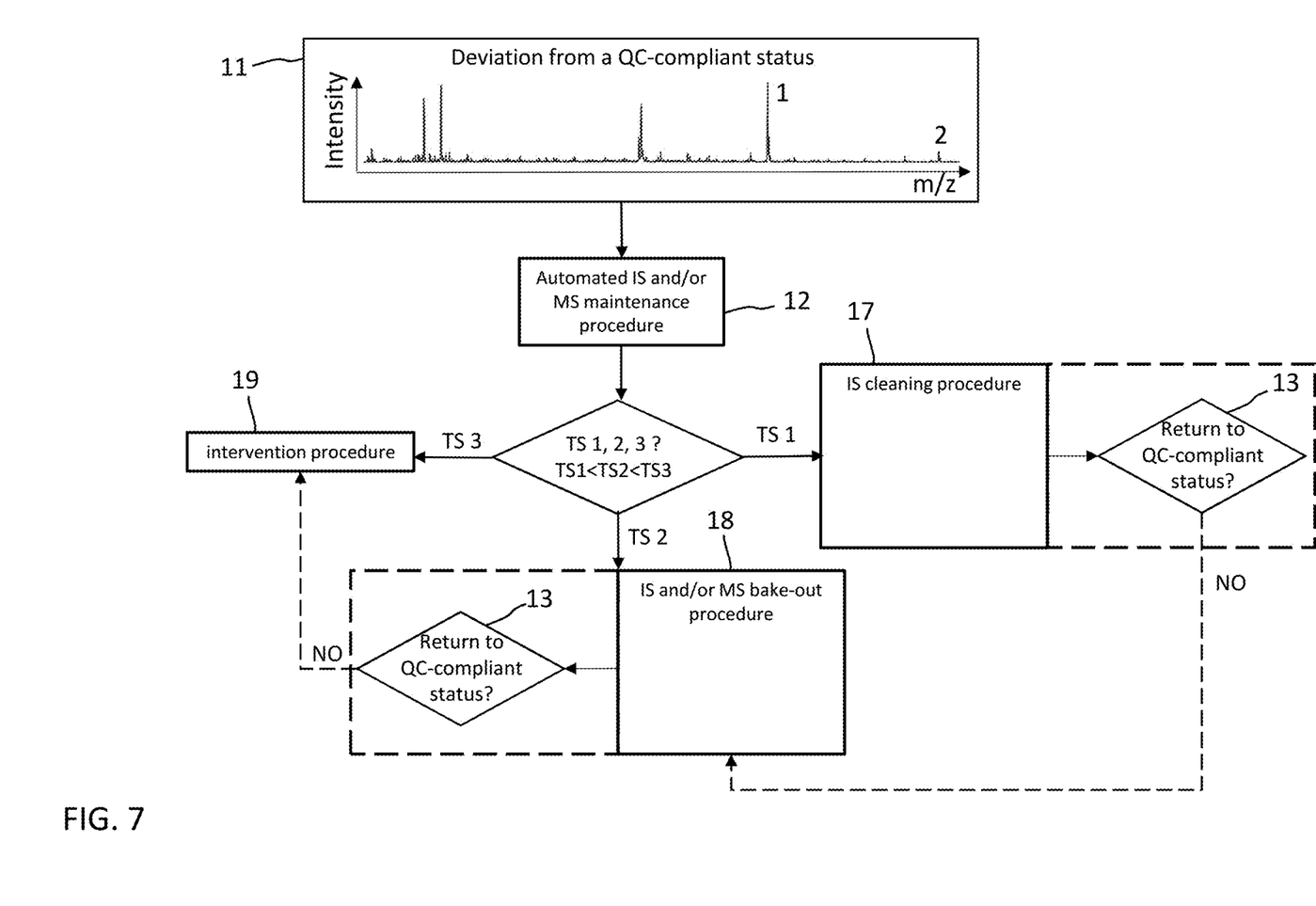
FIG. 7 schematically depicts additional aspects of the method of FIG. 6.

As a continuation of FIG. 6, FIG. 7 depicts schematically another embodiment according to which the method comprises triggering the IS and/or MS bake-out procedure 18 upon determining 13 a failed return to the QC-compliant status during or after the IS cleaning procedure 17; and/or triggering the intervention procedure 19 upon determining 13 a failed return to the QC-compliant status during or after the IS and/or MS bake-out procedure 18.

Figure 8:
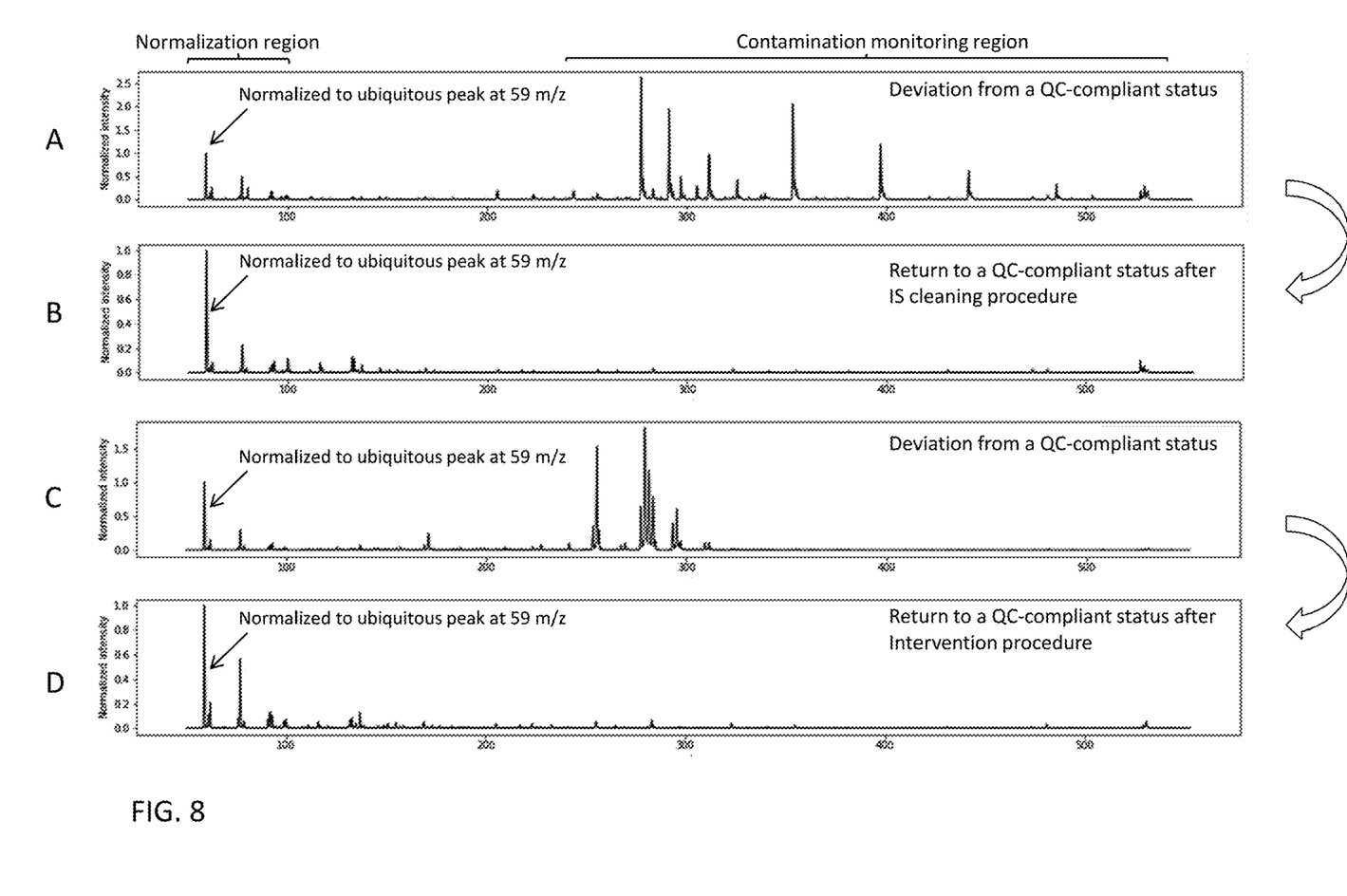
FIG. 8 schematically shows an example of determining the deviation of the one or more predetermined parameters above the one or more thresholds and of determining return to a QC-compliant status.

FIG. 8 depicts another embodiment of the method where determining the deviation of the one or more predetermined parameters above the one or more thresholds (presence of peaks indicating contaminants) comprises normalizing peak intensities to intensities of ubiquitous peaks in an m/z spectrum. In particular, it can be seen that predetermined parameters, like peak intensities, can be more easily compared (taking note of the different scale on the intensity axis), and determination whether they lay above or below a threshold value is made simpler, by relative comparison, before and after or during an automated IS and/or MS maintenance procedure. With particular reference to full scan m/z spectra A-D in FIG. 8, ubiquitous peaks like a peak at 59 m/z, typically appearing, according to the conditions used, in an m/z range indicated as normalization region, may be taken as reference peaks for normalization. In this example, spectrum A shows a deviation from a QC-compliant status due to the presence of several contaminant peaks in a region indicated as contamination monitoring region where contaminants if present typically appear. Spectrum B shows a return to a QC-compliant status by disappearance or return of the peak intensities below a threshold value of those peaks after an IS cleaning procedure. Spectrum C shows a deviation from a QC-compliant status due to the presence of other contaminant peaks. Spectrum D shows a return to a QC-compliant status by disappearance or return of the peak intensities below a threshold value of those peaks after an intervention procedure.

Figure 9:
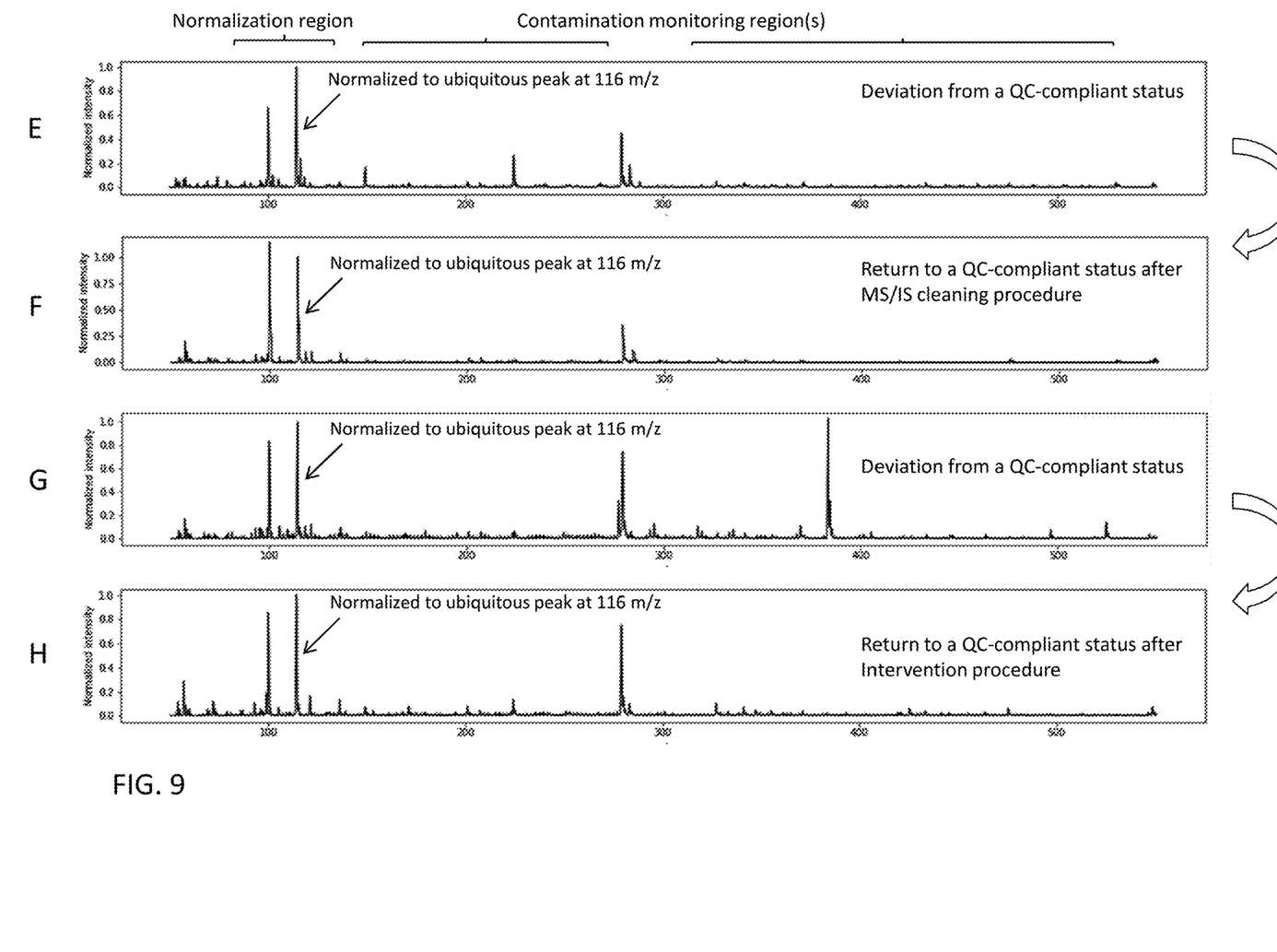
FIG. 9 schematically shows another example of determining the deviation of the one or more predetermined parameters above the one or more thresholds and of determining return to a QC-compliant status.

FIG. 9 shows an example similar to that of FIG. 8 with other spectra E-H obtained under different conditions compared to those of FIG. 8 and indicating different normalization and contamination monitoring regions respectively. In particular, an ubiquitous peak at 116 m/z was selected as reference for normalization. In this example, spectrum E shows a deviation from a QC-compliant status due to the presence of several contaminant peaks in a region indicated as contamination monitoring region where contaminants if present typically appear. Spectrum F shows a return to a QC-compliant status by disappearance or return of the peak intensities below a threshold value of those peaks after an IS/MS bake out procedure. Spectrum G shows a deviation from a QC-compliant status due to the presence of other contaminant peaks. Spectrum H shows a return to a QC-compliant status by disappearance or return of the peak intensities below a threshold value of those peaks after an intervention procedure.

According to another embodiment (not shown), determining the deviation of the one or more predetermined parameters above the one or more thresholds comprises weight averaging peak intensities in an m/z region, particularly a contamination monitoring region, of the m/z spectrum for a plurality of unexpected peaks (contaminant peaks) and determining whether this weighted average value is above or below a threshold value.

Figure 10:
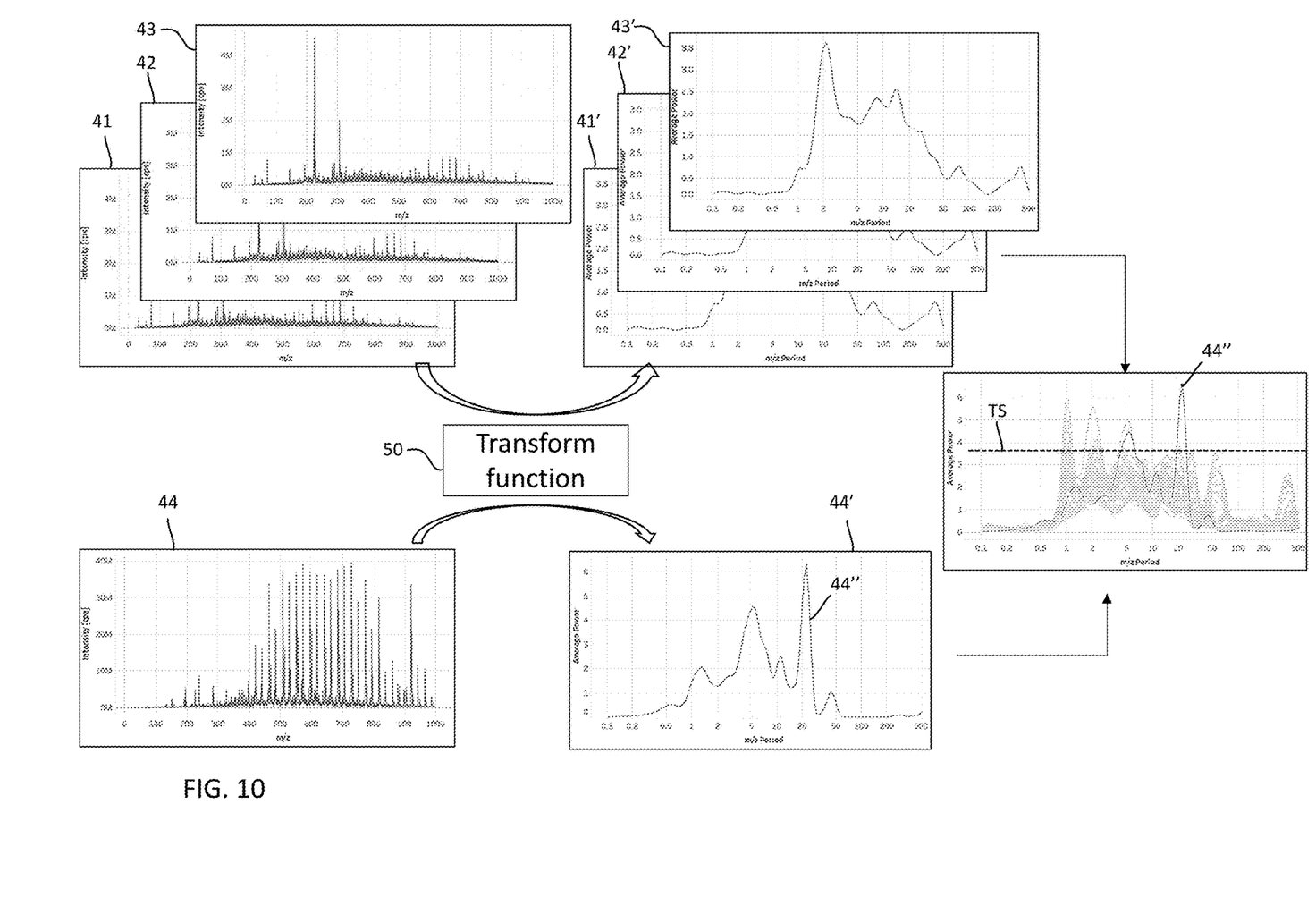
FIG. 10 schematically shows another example of determining the deviation of the one or more predetermined parameters above the one or more thresholds comprising using a transform function.

FIG. 10 schematically shows another example of determining the deviation of the one or more predetermined parameters above the one or more thresholds comprising reducing the complexity of m/z scan data by using a mathematical transform function 50. In particular, the method comprises transforming the m/z scan data of respective m/z spectra 41, 42, 43, 44 (reporting intensity, e.g., measured in counts per second [cps], versus m/z values) into decomposed data 41', 42', 43', 44' plotting average power versus m/z periods, that is plotting the abundance or recurrence of periodic signals for each m/z period. In particular, the method comprises identifying periodic signals 44'' (as predetermined parameters) out of the transformed data 41', 42', 43', 44' above a predetermined threshold (TS) in order to determine a deviation from a QC-compliant status. In this example, m/z spectrum 44 shows an abundance of a periodic signal with an m/z period 20, i.e., with consecutive m/z peaks recurring at intervals of 20 m/z. The mathematical transform function 50 makes the automatic recognition of this abundant periodic signal 44'' from the transformed data 44' above a predetermined threshold (TS) simpler and faster out of a large data set 41,42, 43, 44 without necessarily having to employ sophisticated and calculation-intensive algorithms for peak recognition, and hence well applicable for continuous monitoring of QC-compliance.

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the disclosure may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

What is claimed is:

1. An automated method of maintaining in a QC-compliant status an analytical system comprising a mass spectrometer (MS) coupled to liquid chromatography (LC) via an ionization source (IS), the method comprising:
    determining a deviation of the analytical system from a QC-compliant status by determining a deviation of one or more predetermined parameters in an m/z spectrum above one or more predetermined thresholds,
    triggering an IS and/or MS maintenance procedure upon determining a deviation from the QC-compliant status,
    determining a return or a failed return to the QC-compliant status during and/or after the IS and/or MS maintenance procedure by determining a return or a failed return respectively of the one or more predetermined parameters in an m/z spectrum below the one or more predetermined thresholds,
    triggering another IS and/or MS maintenance procedure upon determining a failed return to the QC-compliant status.

2. The automated method of claim 1, wherein the one or more predetermined parameters are any one or more of shape or area of one or more m/z peaks, signal/noise ratio, m/z peak height, ratio of m/z peak heights, background signal intensity, m/z value of peak maximum, m/z mass position, presence of one or more unexpected m/z peaks, height of the one or more unexpected m/z peaks.

3. The automated method of claim 1, wherein the IS and/or MS maintenance procedure is any one or more of:
    an IS cleaning procedure comprising liquid infusion into the IS;
    an IS and/or MS bake-out procedure comprising increasing the temperature of the IS or IS parts and/or MS parts;
    an intervention procedure comprising manual cleaning and/or repairing and/or replacing of the IS or IS parts and/or MS parts and comprising automated reducing of the IS and/or MS temperature before manual intervention and automated increasing of the IS and/or MS temperature after manual intervention and/or automated reducing or removing of a vacuum condition in the IS and/or MS before manual intervention and automated reestablishment of the vacuum condition in the IS and/or MS after manual intervention.

4. The automated method of claim 3, wherein the IS and/or MS maintenance procedure further comprises any one or more of:
    automated increasing of gas flow in order to reduce the IS and/or MS temperature;
    automated disconnection of the IS and/or MS from a power supply;
    automated enablement/disablement of manual access to the IS and/or MS by automated interlock activation/deactivation;
    automated changing of a vacuum condition in the IS and/or MS.

5. The automated method of claim 3 further comprising interrupting the IS cleaning procedure or the IS and/or MS bake-out procedure upon determining a return of the one or more predetermined parameters in an m/z spectrum obtained during the IS cleaning procedure or during the IS and/or MS bake-out procedure, respectively, below the one or more predetermined thresholds.

6. The automated method of claim 3 further comprising triggering a repeated IS cleaning procedure under the same or different conditions upon determining a failed return to the QC-compliant status during or after the IS cleaning procedure, or triggering a repeated IS and/or MS bake-out procedure under the same or different conditions upon determining a failed return to the QC-compliant status during or after the IS and/or MS bake-out procedure.

7. The automated method of claim 3 further comprising triggering the IS and/or MS bake-out procedure after the IS cleaning procedure upon determining a failed return to the QC-compliant status during or after the IS cleaning procedure.

8. The automated method of claim 3 further comprising triggering the intervention procedure after the IS cleaning procedure and/or the IS and/or MS bake-out procedure upon determining a failed return to the QC-compliant status during or after the IS cleaning procedure and/or the IS and/or MS bake-out procedure.

9. The automated method of claim 3 further comprising:
    setting a first threshold (TS1) for the deviation of the one or more predetermined parameters in order to trigger the IS cleaning procedure;
    setting a second threshold (TS2) for the deviation of the one or more predetermined parameters in order to trigger the IS and/or MS bake-out procedure;
    setting a third threshold (TS3) for the deviation of the one or more predetermined parameters in order to trigger the intervention procedure;
    wherein the third threshold (TS3) is higher than the second threshold (TS2) and the second threshold (TS2) is higher than the first threshold (TS1).

10. The automated method of claim 9 further comprising triggering the IS and/or MS bake-out procedure upon determining a failed return to the QC-compliant status during or after the IS cleaning procedure; and/or triggering the intervention procedure upon determining a failed return to the QC-compliant status during or after the IS and/or MS bake-out procedure.

11. The automated method of claim 1, wherein determining the deviation of the one or more predetermined parameters above the one or more thresholds comprises normalizing peak intensities to intensities of ubiquitous peaks in the m/z spectrum.

12. The automated method of claim 1, wherein determining the deviation of the one or more predetermined parameters above the one or more thresholds comprises weight averaging peak intensities in an m/z region of the m/z spectrum for unexpected peaks.

13. The automated method of claim 1, wherein determining the deviation of the one or more predetermined parameters above the one or more thresholds comprises reducing complexity of m/z scan data by using a mathematical transform function in order to identify periodic signals above a predetermined threshold.

14. An analytical system comprising:
    a liquid chromatography (LC) module,
    a mass spectrometer (MS) module coupled to the LC module via an ionization source (IS), and
    a processor connected to a memory storing instructions that, when executed by the processor, cause the processor to execute any of the automated method steps according to claim 1.

* * * * *